(12) United States Patent
Thompson

(10) Patent No.: US 9,137,878 B2
(45) Date of Patent: Sep. 15, 2015

(54) DYNAMIC LIGHTING BASED ON ACTIVITY TYPE

(75) Inventor: Maria Thompson, Cheshire, CT (US)

(73) Assignee: OSRAM SYLVANIA Inc., Danvers, MA (US)

( * ) Notice: Subject to any disclaimer, the term of this patent is extended or adjusted under 35 U.S.C. 154(b) by 759 days.

(21) Appl. No.: 13/425,520

(22) Filed: Mar. 21, 2012

(65) Prior Publication Data
US 2013/0249410 A1    Sep. 26, 2013

(51) Int. Cl.
H05B 37/02    (2006.01)

(52) U.S. Cl.
CPC .................... *H05B 37/0227* (2013.01)

(58) Field of Classification Search
USPC .............................. 315/20, 149–160, 360–362
See application file for complete search history.

(56) References Cited

U.S. PATENT DOCUMENTS

| 2003/0122507 | A1* | 7/2003 | Gutta et al. ................. 315/292 |
| 2005/0237733 | A1 | 10/2005 | Laski |
| 2006/0071605 | A1* | 4/2006 | Diederiks ....................... 315/76 |
| 2008/0265799 | A1* | 10/2008 | Sibert ........................ 315/292 |
| 2009/0262189 | A1 | 10/2009 | Marman |
| 2010/0141153 | A1* | 6/2010 | Recker et al. ................. 315/149 |
| 2010/0327766 | A1* | 12/2010 | Recker et al. ................. 315/291 |
| 2011/0133655 | A1* | 6/2011 | Recker et al. ................. 315/159 |
| 2012/0086345 | A1* | 4/2012 | Tran ............................. 315/158 |
| 2013/0038218 | A1* | 2/2013 | Xu et al. ...................... 315/151 |
| 2013/0342131 | A1* | 12/2013 | Recker et al. ................. 315/292 |

OTHER PUBLICATIONS

European Search Report EP 13159981received on Sep. 9, 2013.

* cited by examiner

Primary Examiner — Brandon S Cole
(74) Attorney, Agent, or Firm — Andrew Martin

(57) ABSTRACT

Dynamic lighting techniques are disclosed that consider activity within a given area so as to provide lighting to that area with a high degree of context awareness. In some embodiments, the techniques not only consider physical activity within a given area, but further consider emotional activity within that area, and provide lighting geared toward or otherwise appropriate for such specific activity. In some embodiments, physical activity is divided into general activity and specific activity; emotional activity may be subdivided in a similar fashion. Other factors may be considered as well, including the layout of the area being illuminated and/or any user provided lighting preferences. In some embodiments, user preferences can be used to override general physical and/or emotional activity, and specific physical and/or emotional activity can override the user preferences. Numerous variations and lighting systems will be apparent in light of this disclosure.

19 Claims, 4 Drawing Sheets

DYNAMIC LIGHTING BASED ON ACTIVITY TYPE

BACKGROUND

The lighting of an area is typically done is a static fashion. In particular, once the lights configured to illuminate a given area are installed, the lights are either on or off. In some cases, sensors can be used to detect movement in the area, so that the lights can be automatically turned on when movement is detected in the area, and automatically turned off when no movement occurs for a given period of time. Some lighting configurations considered are more dynamic, in that activity within a given area is evaluated, and the lighting intensity can be varied based on that activity.

DETAILED DESCRIPTION

Figure 1:
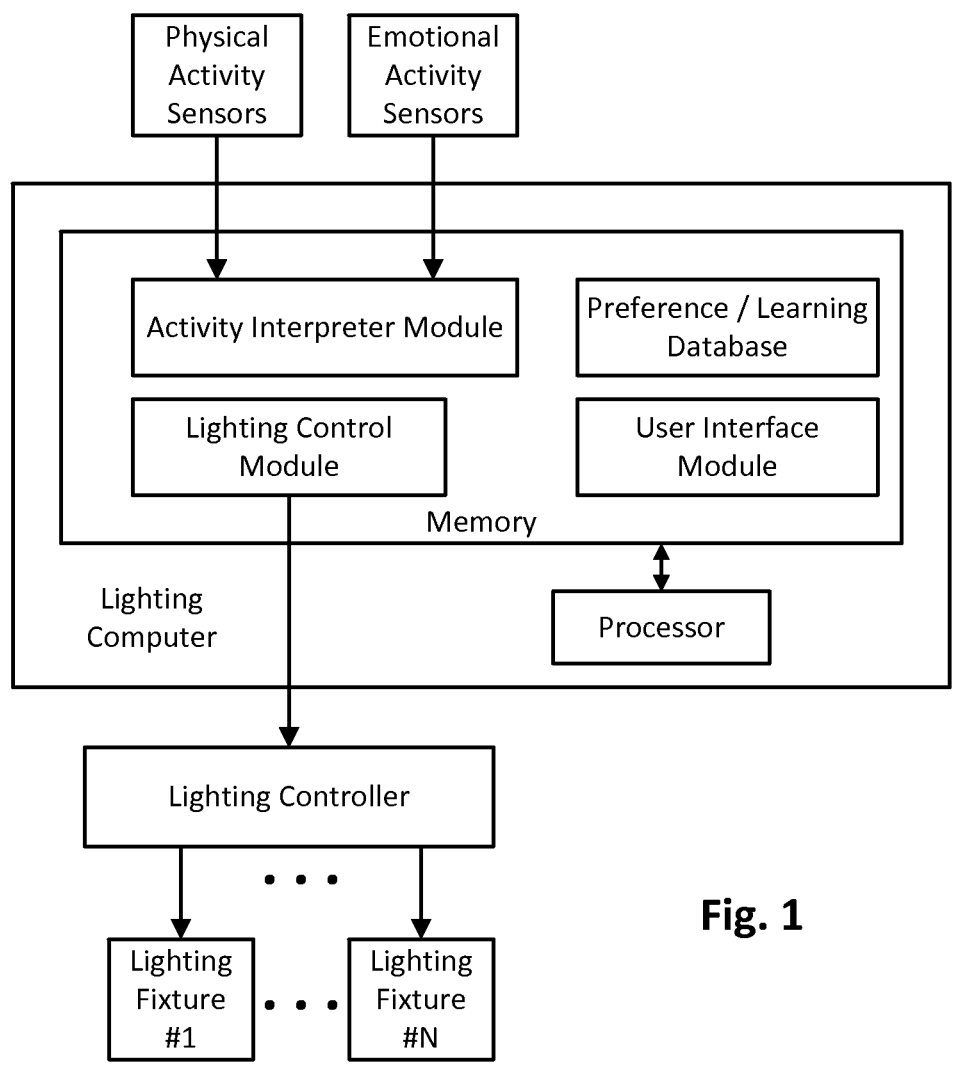
FIG. 1 is a block diagram illustrating a dynamic lighting system configured in accordance with an embodiment of the present invention.

Dynamic lighting techniques are disclosed that consider activity within a given area so as to provide lighting to that area with a high degree of context awareness. In some embodiments, the techniques not only consider physical activity within a given area, but further consider emotional activity within that area, and provide lighting geared toward or otherwise appropriate for such specific activity. In some embodiments, physical activity is divided into general activity and specific activity; emotional activity may be subdivided in a similar fashion, with each type of activity causing light to be adjusted in a particular way. Other factors may be considered as well, including the layout of the area being illuminated and/or any user provided lighting preferences or learned preferences. In some embodiments, user preferences can be used to override general physical and/or emotional activity, and specific physical and/or emotional activity can override the user preferences. Numerous variations and lighting systems will be apparent in light of this disclosure.

General Overview

As previously explained, lighting of an area is typically done is a static fashion (lights are on or off, without further variance or refinement), and in some instances, lighting is more dynamic, where the activity within a given area is evaluated and the lighting intensity is varied based on that activity. In other cases, sensors can be employed to detect movement, so that lighting is only provided when movement is detected within the area to be illuminated. While such lighting schemes provide a degree of energy efficiency and convenience, there remain a number of non-trivial and unaddressed issues associated with dynamic or so-called context-aware lighting.

For instance, once a motion sensor based lighting system detects movement and turns on the corresponding lights, those lights then stay on for a set or otherwise static period of time, an no further refinement in the lighting scheme is made. Likewise, while general user activity can be detected to determine an appropriate lighting intensity, such arrangements are fairly one dimensional (e.g., person is lying on couch, so dim lights; person is standing in kitchen at island, so turn on island light). While such one dimensional lighting responses may be acceptable in some instances, in other instances, the person may be engaging in a specific activity that calls for a specific lighting scheme. Thus, there is a need for a deeper context-awareness based lighting system.

Thus, and in accordance with an embodiment of the present invention, dynamic lighting techniques are disclosed that consider a range of activity within a given area so as to provide lighting to that area with a high degree of context awareness. In some embodiments, the techniques not only consider general physical activity within a given area, but further consider various specific physical activities and provide lighting geared toward that specific activity. In other embodiments, emotional activity can be considered when provisioning a lighting scheme. Other factors may be considered as well, including the layout of the area being illuminated and/or any user provided or otherwise learned lighting preferences. In some such embodiments, the identification of general physical activity (e.g., walking, standing, lying down, sitting) can be used, for instance, as an indicator as to when to turn lights on and off and/or how to set light intensity, unless there is an overriding user preference that calls for a different lighting response. In some such embodiments, the identification of specific physical activity (e.g., direction of gaze based on nose direction, position of arms and/or hands) can be used, for instance, to override general preferences and/or to provide highly directional and/or an otherwise specific lighting response tailored to the specific activity detected. In some embodiments, emotional activity, as indicated for instance by sound, facial expressions and/or other telling gestures (e.g., speech, sighs, crying, laughter, raised eyebrows, stress/anxiety or panic as indicated by running, etc) to override general preferences and/or to provide highly directional and/or an otherwise specific lighting response tailored to the emotional activity detected. Any number of sensors and systems can be used to detect activity, including any number of cameras, microphones, range finders, passive infrared (PIR) motion sensors, acceleration-based object movement sensors, smoke/carbon monoxide detectors, etc.

Example general physical activities include, for instance, walking, sitting, standing in a location, or laying down, to name a few. In one embodiment of the present invention, when such general activities are identified, the occupied area can be lit accordingly with a general lighting scheme. For instance, lights with respect to the occupied area or walking path can be timely turned on to an established intensity suitable for the identified general activity. The particular lighting scheme chosen can be, for example, defined by user preference or a default lighting scheme. In one specific such example case, a person may have three chairs that he or she commonly uses: one chair for watching television, one for eating, and one for reading. The person may prefer brightest light when reading, medium light when eating, and dimmest light when watching television. Thus, a lighting system configured in accordance with an embodiment of the present invention may execute one of those lighting preferences in response to detecting the person in the corresponding chair. Numerous such lighting responses to general activity will be apparent in light of this disclosure, and the claimed invention is not intended to be limited to particular activity.

An example specific physical activity that can be detected, for instance, includes a double head-bob toward and away from extended arms/hands holding an object in front of the person's face, thereby indicating a difficulty in seeing the object being held (e.g., a book or food container having a small print label). For instance, and continuing with the previous three chair example, assume the person has decided to read in the chair normally used for television. Perhaps, for instance, the chosen movie is not particularly interesting or the person likes to read during commercials. In any case, the dim light setting suitable for TV-watching is not suitable for reading and the person therefore does a double head-bob and/or hand and arm movement suggesting the difficult in seeing the book. Thus, a lighting system configured in accordance with an embodiment of the present invention may detect this specific physical activity and override the general preference, and execute a specific lighting scheme that turns on a light to reading level intensity in that location. In some such embodiments, the system may be configured to further specifically direct light to the object being held by way of directional lighting. For instance, a gimbaled or otherwise pivotable lens assembly of the light being engaged can be positioned to focus bright light on the book. Such lens assemblies allow the lens to be movable in two or three dimensions, thereby allowing for a full range of beam focusing capability.

In another example scenario, assume a home owner has provided a general preference to not automatically turn on the lights in the kitchen after 6 am. Thus, the general physical activity of the person, for instance, entering the kitchen, opening a cabinet, and retrieving a coffee cup can still be detected, but no lights will be turned on in accordance with the preference. However, should the user then attempt to pour a cup of coffee, the specific physical activity of the person holding a coffee pot over the cup could also be detected and lighting for that particular area could then briefly be turned on and optionally specifically directed to the coffee cup on the counter or in the person's hand, and then gradually dimmed back to an off state, so as to allow the person's eyes to adjust to the ensuing lower lighting intensity. Numerous specific activities that can be associated with a correspondingly specific and/or directional lighting scheme or deviation from a preferred lighting scheme will be apparent in light of this disclosure, and the claimed invention is not intended to be limited to any particular types of specific or general activities.

As previously indicated, emotional activities such as, for instance, raised voice indicating anger, sighs, crying, laughter, raised eyebrows, and stress or panic as indicated by running can also be taken into consideration to provide a deeper and more personal insight into the lighting experience. The lighting response to such detected emotions can be based, for example, on user personal preference or an otherwise psychologically appropriate lighting scheme given the perceived emotion. Thus, a lighting system configured in accordance with an embodiment of the present invention may detect, for example, that a person in the room is crying and override the general lighting preference, and execute a specific lighting scheme intended to be soothing in that location. Numerous emotional activities that can be associated with a desirable lighting scheme or deviation from a preferred lighting scheme will be apparent in light of this disclosure, and the claimed invention is not intended to be limited to any particular types of emotion-based activities.

A person's preferences can be made known to the lighting system, for example, in real-time (based on voice commands to the system), and/or by programming those preferences into the system using a user interface. The system may also learn a person's preferences based on, for example, historical data associated with that person and collected by the system over a period of time. Programmed preferences may include verbal commands (e.g., engage lights in response to command, 'lights on') or non-verbal (e.g., detection of snoring equals dim lights to an established low intensity; detection of a fast-moving person based on range finding, for instance, equals all lights on full intensity). Any number of personal preferences can be programmed or otherwise established.

Numerous variation and embodiments will be apparent in light of this disclosure. For instance, another embodiment of the present invention includes a light fixture configured with a sensor for detecting activity. The sensor may be, for example, a camera, microphone, range finder, or some combination of sensors). The light fixture may be further configured with a directional lensing assembly otherwise movable to provide a degree of directional lighting capability. Another embodiment of the present invention includes a light bulb (e.g., LED or other light bulb) that is configured with a sensor for detecting activity as described herein. In such cases, the sensor may be configured with heat management capability if so desired, depending on heat generated by the bulb. Another embodiment includes a system configured to implement the various techniques provided herein, and example of which will be discussed in turn with reference to FIG. 1.

One such system effectively provides a closed-loop feedback lighting system for evaluating and improving the implementation of an architectural lighting system based on tunable LED technology. Such closed-loop feedback can be used, for instance, to enhance the ability for lighting changes to strategically and effectively respond to a user's ongoing activities. A sensing platform uses multimodal wired or wireless sensors and computer vision to detect an individual's presence and uses computational reasoning to make inferences about the activities in which they are engaged. A recognition engine or activity classifier provides event-driven and polling access to the inferred activities, which the LED system will use to make contextually relevant lighting changes to the various users of the space. An automated context-aware experience sampling application running on, for instance, a mobile device responds to changes in the inferred activities, delivering questions or prompts to the user, and the user's responses are then used to improve the performance of the activity classifier and refine the behavior of the lighting application. Thus, the closed-loop feedback can be used to enhance the performance of a sensor-driven activity recognition system that drives an environmental output device, which in this example embodiment is a tunable lighting system.

Computer Vision Based Activity Detection

The activity detection techniques may be implemented using any number of suitable technologies, as will be appreciated in light of this disclosure. Once activity is detected it can then be identified and categorized by various techniques. For instance, in accordance with one example embodiment, identifying a given activity includes identifying the prevailing field of view (FOV) of the person(s) within the space. In one such embodiment, the sensor system can then communicate the prevailing direction of gaze of the user(s) to the lighting system, which will be controlled to provide the main area of focus within the user(s) main FOV with a differentiated lighting design.

An example of a sensor system that can be used in accordance with one example embodiment is a computer vision system (sometimes referred to as machine vision or automated imaging) which is configured to carry out an automated extraction of information from images. The image data to be used can be, for example, video sequences from one or multiple cameras positioned in the space to be illuminated, so as to record the activities of people using that space. As will be appreciated, the raw input comprises video sequences, but the actionable data are calculations representing certain mathematical features of the image space, in accordance with one such example embodiment. Such computer vision based strategies are commercially available and are able to decode specific information about the position and activities of the users such that a person's direction of gaze could be determined. The direction of gaze can be determined, for instance, by identifying the direction of a person's nose, in accordance with some embodiments. The nose is a fairly precise reference to determining a person(s) direction of gaze and therefore, prevailing field of view. The main element of the human nose, the nasal septum, is a vertical plate of bone and cartilage that separates the left and right airways in the nose, dividing the two nostrils, and generally stays in the midline of the face. Identifying such features can be used in directing a lighting system, in accordance with some embodiments of the present invention.

In more detail, and in accordance with one specific embodiment, a computer vision system identifies a human (or group of humans) within the range of detection of the camera(s). The cameras can be configured to identify markers for head, shoulders, arms, hips and legs. One example commercial system that has such functionality, for instance, is the Kinect system produced by Microsoft for the Xbox 360 video game console. In general, Kinect is a camera-based motion sensing system that enables users to control and interact with the Xbox 360 game console without the need to touch a game controller, through a natural user interface using gestures and spoken commands. A similar concept and implementation can be used in accordance with an embodiment of the present invention to allow users to control and interact with a given lighting system without the need to touch light switches, through a natural user interface using gestures and spoken commands. Various other suitable commercial computer visions systems will be apparent in light of this disclosure.

In any case, the computer vision system can be used to further identify the nose(s) of the person(s), and the direction where the nose is pointing to. In accordance with some such embodiments, the computer vision system can then send information of the nose's position and direction to a lighting computer configured to determine from this information the main field of view for that person(s), which can become the main area of focus for the lighting system. In some such embodiments, a lighting controller can then receive a lighting command from the lighting computer, and send that command to the various lighting fixtures illuminating the areas in and outside the main field of view, so that the areas that are within the main direction of gaze receive a differentiated and contrasting illumination. In one specific such example embodiment, the lighting fixtures could be installed within location zones, each zone constituting a group of fixtures controlled together. Each zone could illuminate a specific area within the space and the sensing system would identify the main zone of focus. In some such cases, a differentiated illumination could be achieved, for example, from spectral manipulation (e.g., such as tuning the color channels of a multi-color light emitting diode (LED) system to change the color of the light or quality of white light), or through kinetic movement of the light engine thereby altering the angle of incidence or location of the light beams. In this latter instance, a series of adjustable lenses (or moveable fixtures with fixed lens) could be configured and operated to provide movable beams to offer differentiated lighting to suit, for instance, the focus of the computer vision system or camera(s).

As will be further appreciated in light of this disclosure, the activity of the space user(s) can also be identified through the tracking of the movement and positioning of arms and hands. In general, the movements and positioning of the arms and hands combined constitutes a fairly strong indication of the activity in which a person in a given space having an established context is engaged. This is especially true if such information is considered in combination with the positioning of the nose, as previously described. For instance, and in accordance with another embodiment of the present invention, a computer vision or other suitable sensor system can be used to capture the movement and positioning of arms and hands in relationship to the position of the nose. The computer vision system (or lighting computer) can then identify the main activity of the user(s) and communicate various commands to the lighting controller. In some such embodiments, according to information received, the lighting controller can operate or otherwise command the lighting fixtures to provide the area around the users with a differentiated lighting scheme, optimized for the identified activity. Just as commercially available computer vision based strategies can be used to determine a person's direction of gaze as previously described, such strategies can also be used to decode specific information about the position and movements of arms and hands. In more detail, and in accordance with one specific embodiment, a computer vision system can be used to identify: (a) the position of the arms and hands; (b) the position of these members in relationship to each other; and (c) the position of these members in relationship to the nose. The computer vision system can be programmed or otherwise configured to recognize the types of movements that the arms/hands are involved in, and thus infer about the main activities performed by the person(s). Examples of arms/hands based activities include, for instance: (a) arms folded 90° with hands leaning over the computer keyboard indicate the activity of typing on computer, which could be further established by also detecting that nose direction is straight out; (b) arms and hands in a straight line in continuous swinging movements back and forward indicate the activity of walking; (c) arms extended and bent at 120° with hands on a C-shape indicate the activity of holding glass or drinking, which could be further established by also detecting that nose direction is pointing upward; (d) arms extended and bent at 90° with hands holding book or the like indicate the activity of reading, which could be further established by also detecting that nose direction is pointing downward; (e) one arm and hand at person's ear indicate the activity of talking on the phone; (f) one arm extended in front of person with forearm parallel to person's chest indicate the activity of checking watch for time, which could be further established by also detecting that nose direction is pointing downward; (g) one arm and hand extended forward and resting on table and other hand holding a pen or the like indicate the activity of writing on paper, which could be further established by also detecting that nose direction is pointing downward; (h) one or both of the hands and arms are generally moving around in a gesture-like fashion indicate the activity of talking; (i) both arms folded and bringing two hands together in a C-shape indicate person is eating a sandwich (possibly with nose pointing downward), whereas if the arms were in the same position but the hands were closed may indicate that the person is eating something small (possibly with nose pointing straight out); and (j) one arm is extended and bent in front of person and hand is in C-shape while other hand is near mouth indicate activity of eating while drinking (e.g., when person holds a cup or bottle, hand forms a C-shape between thumb and index finger). After collecting such information, the computer vision system can send that information to the lighting computer, which can translate or otherwise further interpret the received information and then issue the appropriate command(s) to the lighting controller. In accordance with some such embodiments, the lighting controller receives the command(s) from the lighting computer and sends command(s) to the various lighting fixtures so as to illuminate the main zone or area of focus indicated by the arms/hands activity, so that area can be provisioned with a differentiated and contrasting illumination as previously explained. As also previously explained, the lighting fixtures can be grouped into location zones, each zone constituting a group of fixtures that can be controlled together. In some such embodiments, each zone could illuminate a specific area around the users (directly above or in their vicinities) after the sensing system identifies the main area of focus. As previously described, the differentiated illumination can be achieved in many different ways within a zone. For instance, the light controller(s) can be commanded to send the information to: (a) a group of lighting fixtures; (b) each lighting fixture individually; or (c) to each LED chip individually. In addition, or alternatively, the light controller(s) can be commanded to engage an adjustable lens assembly, so as to provide directional lighting when appropriate. As will be appreciated, the level of controllability will depend on the resolution at which components are addressable for tuning (e.g., to the individual zone level, to individual fixture level, or to the individual LED chip level). As previously explained, the lighting changes that can be commanded are also nearly unlimited, ranging from various spectral manipulation (e.g., tuning the color channels of a multi-color LED system to change the spectral quality or quantity of the light), to kinetic movement of the light engine (e.g., altering the angle of incidence or location of the light beams using, for instance, adjustable lens (or moveable fixtures with fixed lens).

Any such lighting control systems as described herein would allow or otherwise afford a greater degree of design freedom to lighting designers to specifically treat the area within the users' main field of view differently from the surrounding areas. Such systems could be used, for example, to save energy and/or for architectural lighting design strategies as a tool to generate dynamic special effects empowered by the contrast between the area of focus and its periphery, and by an interactive component with the users. Numerous embodiments and applications will be apparent in light of this disclosure.

For energy savings purposes, for example, lights illuminating areas which are out the main field of view could be dimmed down, turned off or have the white spectrum altered to operate in energy saving modes, such as reduced color rendering index (CRI) or colored light (e.g., green, with reduced energy consumption). This application would potentially be suitable, for instance, for offices, libraries, schools, and other locations where users tend to stay put in one position (e.g., while working, reading, doing computer work, etc) for prolonged and sometimes arbitrary periods of time. U.S. Pat. No. 7,598,859, which is herein incorporated by reference in its entirety, discloses an example method and system for controlling lighting in a space that reduces energy consumption of the light sources, by changing at least one of the CRI and the correlated color temperature (CCT) while maintaining illumination levels. Such a system can be further configured in accordance with an embodiment of the present invention. In one such embodiment, the method and system sense movement of people in the space relative to light sources that light the space, and automatically and individually adjust plural solid state lighting devices that form each of the respective light sources to a first lighting condition when people are in a first position, wherein the lamps respectively emit light of a first illumination level and a first CRI at a first electrical power level, and to a second lighting condition when people are in a second position, wherein the light sources respectively emit light of the first illumination level and a smaller CRI than the first CRI and at a lower electrical power level than the first electrical power level.

For architectural lighting design and/or special purposes, for example, wherein the lighting system is configured to identify that people are eating or talking to each other in a given area, and to command a light scene that would provide a more appropriate lighting setting for ambiance around the area. Ancillary features that can be controlled, for instance, include music selection, aroma therapy, and air conditioning. Any number of such features may be controlled in conjunction with the lighting control.

For decorative and/or special effects purposes, for example, lights illuminating areas which are in the main field of view could be controlled to produce special effects such as highlighting merchandise or architectural features, contrasting with the illumination of the surrounding areas out of the field of view. In this case, customers would experience a surprise element as they see the lighting respond differently to where they are looking, and would also be given the opportunity for an interactive participation in the lighting, thereby further enhancing the customer-experience. One such example is in a retail store, when a customer turns his/her focus to the right and a certain lighting design is initiated to create specific effects or a visual performance, while the surroundings would be slightly dimmed down; when turning his/her focus to the left, the lighting fixtures located on the designated zones would change to produce the special lighting effects in this new area of focus. This type of dynamic control regime could be explored in various ways to attract the attention and interest of users in retail stores, shopping malls, museums, airports, restaurants, and any number of venues where there is opportunity to enhance a customer's/visitor's experience and/or gain from ability to give the 'users' the opportunity to be part of the illumination effects. As will be further appreciated, note that such techniques can be implemented to create very dramatic and spectacular effects in large department stores as well as very subtle and elegant effects in small exclusive stores. For instance, such a lighting control system can be used to pursue and encourage the attention of one customer by highlighting a unique piece of jewelry as the client or customer looks at it, with a stylish surprise effect, or the attention of a group of people looking at a large public display in a shopping mall.

Another application for a lighting system configured in accordance with an embodiment of the present invention is museums or art galleries where dimmed general lighting could be used for display areas disregarded by visitors and highlight these only when a visitor turns his/her attention to the objects displayed. In such cases, the lighting control could be used for both saving energy (e.g., only illuminate works that are actually being viewed) and as a customized effect, such as the highlighted 'just for you' effect as the viewer looks at it, or to draw the visitor to the optimal viewing spot for the giving lighting scheme wherein if the visitor stands too close or too far away, the lighting will not optimally engage, and an increased lighting intensity could be provided to indicate the optimal viewing spot has been achieved). In a more general sense, the lighting control could be used to attract the attention and interest of visitors by contrasting the objects within the main field of view with its surroundings, just as in a retail setting as previously described.

Another application for a lighting system configured in accordance with an embodiment of the present invention is security or safety. For instance and as previously explained, such a lighting control system can highlight a unique piece of jewelry as a prospective client or customer looks at it, with a stylish surprise or otherwise personal effect. However, if further information observed or otherwise detected indicates that the person viewing the jewelry may have bad intent (e.g., based on detected facial expressions and/or body posture known to indicate nervousness or criminal intent), or is simply lingering beyond a reasonable period of time, then the lighting spot focused on the unique piece of jewelry can be, for instance, slowly expanded and brightened so that the lighting encompasses a much wider area including the suspect person. Such dynamic lighting changes effectively deplete the personal effect of the initial encounter and make the publicness of the situation more apparent and may therefore operate to discourage any intended bad behavior or otherwise simply encourage the person to move on.

Lighting Control System

FIG. 1 is a block diagram illustrating a dynamic lighting system configured in accordance with an embodiment of the present invention. As can be seen, the system includes a lighting computer, a number of physical and emotional activity sensors, a lighting controller, and a plurality of lighting fixtures. As will be appreciated, other embodiments may include fewer or more components, depending on the desired functionality. In addition, other embodiments may be implemented with a higher degree of integration, such that some components are include within or otherwise integrated with other components. For instance, in one embodiment, the various physical and/or emotional activity sensors are included in the lighting computer. Numerous other configurations will be apparent in light of this disclosure, and the claimed invention is not intended to be limited to any particular one.

Figure 2:
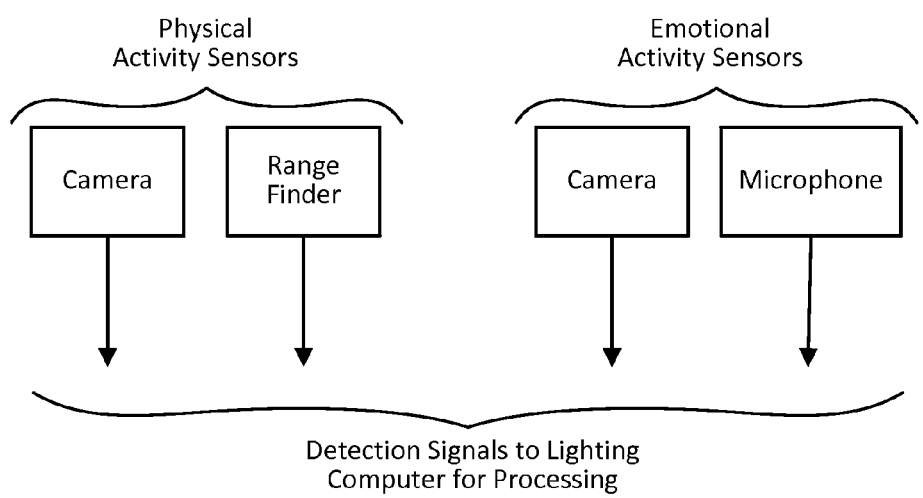
FIG. 2 illustrates example activity sensors that can be used in the dynamic lighting system of FIG. 1, configured in accordance with an embodiment of the present invention.

As shown in FIG. 2, example physical activity sensors include one or more cameras and/or range finders, and example emotional activity sensors include one or more cameras and/or microphones, in accordance with some example embodiments. As will be appreciated, the cameras can be implemented, for instance, with any suitable type of digital camera technology, and can be used to record all types of general and specific activity in a given area, including any activities described herein. The resulting images can then be interrogated or otherwise explored by a computer vision system to detect and identify types of general and specific physical activity. Such cameras can also be used to identify emotional activity, such as facial expressions (e.g., smiling, crying, etc). A range finder can be used, for instance, to determine the distance from the camera to a specific object in the room, so that proper camera focus can be determined in a target cluttered room. Likewise, a range finder can be used to track the speed of a person or object, which may be useful, for instance, in determining an activity such as running. A microphone can be used to capture, for instance, voice commands for specific lighting requests, emotional indicators such as laughter, crying, anger-based yelling, and any other sounds that may be useful in assessing what an appropriate lighting scheme might be (e.g., snoring, dog barking, door bell ringing, etc). Any number of other sensors can be tied into the lighting system if so desired, such as smoke alarms, vibration sensor, carbon monoxide sensors, temperature sensors, natural light detectors, PIR motion sensors, acceleration-based object movement sensors, etc, and the claimed invention is not intended to be limited to any particular sensor type.

The lighting controller can be implemented, for example, with conventional or custom technology, as will be appreciated. An example lighting controller includes, for instance, the DMX512, although any controller capable of receiving lighting commands and issuing the appropriate lighting control signals can be used. Example lighting control signals may be, for instance, for turning a light on/off, adjusting the intensity of light, adjusting the color of light, and/or adjusting the direction of light.

FIGS. 3a-3d each illustrates an example lighting fixture that can be used in the dynamic lighting system of FIG. 1, configured in accordance with an embodiment of the present invention. As will be appreciated, the lighting fixture may be, for example, a single light receptacle configured to receive on/off and/or intensity control signal for the light bulb installed in that receptacle. Additional functionality and structure may be added to the lighting fixture, depending on the application. For instance, the light fixture may include multiple light receptacles (e.g., lighting bank for providing one or more intensities and colors), directional capability (e.g., moveable lens assembly), and/or integrated sensor capability (e.g., camera and/or microphone for providing image and/or sound data to the lighting computer for processing.

Figure 3A:
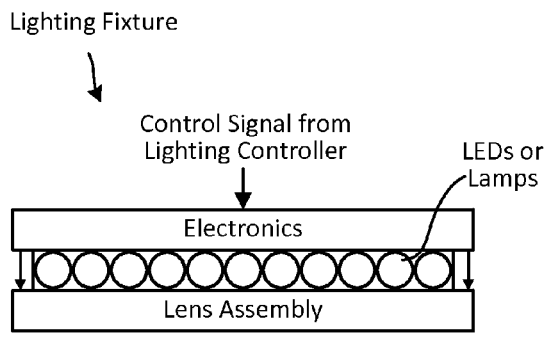
FIGS. 3a-3d each illustrates an example lighting fixture that can be used in the dynamic lighting system of FIG. 1, configured in accordance with an embodiment of the present invention.

As shown in the example configuration of FIG. 3a, the light fixture may include a plurality of LEDs or other suitable lamps. LED technology is used in some embodiments, and may be beneficial, for instance, as it allows light sources to be built in arrays of small light sources that can be individually controlled. For example, systems with multiple LED channels of different colors could be used not only to create various different illumination patterns and movements, but also illumination colors. However, any number of suitable lighting technologies that can be controlled in accordance with an embodiment of the present invention can be used, and the claimed invention is not intended to be limited to any particular LED or other lighting technology.

The example lighting fixture of FIG. 3a further includes electronics configured for receiving a control signal (e.g., from lighting controller), and engaging the corresponding light bulbs in a manner that is responsive to the control signal. In addition, this example embodiment further includes the ability to control a moveable lens assembly for directing the focus and/or direction of light, as described herein. In some such embodiments, for instance, the lens assembly is configured to adjust the lens or lenses, for example, with a gimbal, micro-electromechanical system (MEMS) device, or other suitable actuator that is responsive to a control signal from the lighting controller. In the example embodiment shown, the electronics receives the control signal or signals from the lighting controller and then issues an appropriate actuation signal to the lens assembly. In other embodiments, the lighting controller may communicate directly with the lens assembly, if so desired. Further note that the actuator may be configured to move the lens or lenses in one, two, or three dimensions, depending on the intended functionality. For instance, movement in the x and y axes will allow a full range of scanning or otherwise directing the light emitted from the corresponding lamp or lamps, and movement in the z axis will allow for focusing a given light beam and/or changing the size of the illuminated area.

Figure 3B:
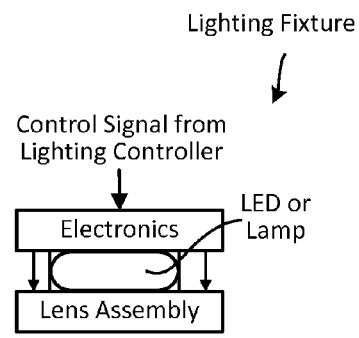

FIG. 3b illustrates another example lighting fixture configuration similar to the one shown in FIG. 3a, but has a single lighting element. The example embodiment in FIG. 3c is configured with lighting elements (e.g., LEDs and/or other lamps types) of different colors, and without a lens assembly. Other such embodiments may include a lens assembly if so desired, as shown in the example embodiment of FIG. 3d. The previous discussion with respect to the electronics and lens assemblies in reference to FIG. 3a is equally applicable here, as will be appreciated.

As will be appreciated, and in accordance with some embodiments of the present invention, multi-chip light-emitting diode (LED) systems with independent channel control coupled with sensor networks allow lighting changes to be actuated in response to the location, activities, and paths of the occupants. The ability to continuously vary the spectra that each fixture emits allows users to, for instance, employ lighting as a powerful architectural design element and as a way to limit energy consumption. When activity dependent selection of light output is enabled, the provision of lighting requiring higher power consumption can be eliminated or otherwise restricted to when and where it is most critically needed (e.g., emergencies, etc). As will be further appreciated in light of this disclosure, it may also open additional functionalities such as improving occupant health or feelings of well-being, and as a communication medium within the given environment. Other possible benefits of such functionality in addition to energy savings include enhanced productivity in the workplace, attraction and flow of clients in a commercial building, or providing a welcoming atmosphere in a hospitality setting.

Figure 3D:
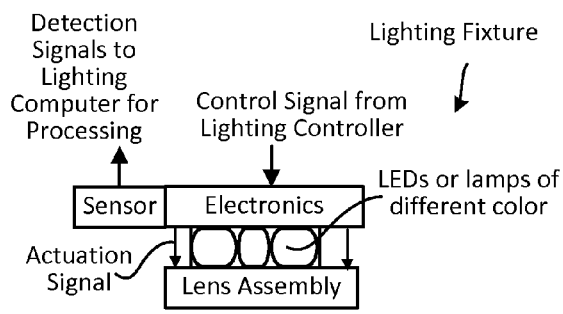
Figure 3C:
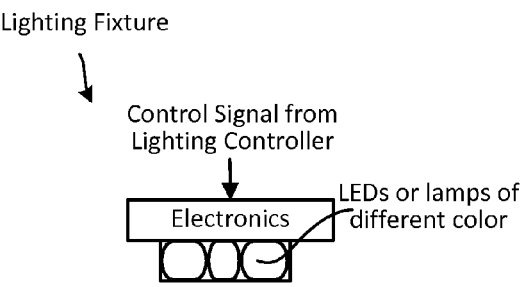

The example embodiment shown in FIG. 3d further includes an embedded or otherwise integrated sensor for observing activity in the area to be illuminated by the light fixture. The sensor can be located in any number of locations on the fixture, depending on factors such as the housing or style of the fixture. For example, with a recessed lighting fixture having a can-type arrangement around the lighting element, the sensor can be clipped or otherwise fastened to the side of the can or tacked into the ceiling area proximate the lighting can. With a sconce-type or chandelier fixture, the sensor can be discretely located at the wall/ceiling anchor portion of the fixture, or clipped or fastened to the decorative portion of the fixture. With a track lighting fixture, the sensor can be located, for instance, in the track or clipped or fastened to the decorative portion of the fixture. In a more general sense, the sensor can be secured to any suitable surface proximate to or associated with the fixture, including any appendage or feature of the fixture, so long as the sensor can serve its intended purpose of observation. As will be appreciated, sensors such as cameras and range finders generally require a line-of-sight to the area being observed and should be placed or otherwise positioned accordingly, while other sensors such as microphones and smoke detectors may be positioned in a less critical fashion. Depending on the sensor configuration, the detections signals may be reported back to the light computer by either a wired or wireless connection. Likewise, a wired or other suitable interface can be used to electrically couple the sensor to the electronics, for purposes of controlling the sensor. Any number suitable communication mediums can be used, as will be apparent.

With further reference to FIG. 1, the lighting computer of this example embodiment includes a processor and a memory. The memory has a number of modules stored thereon that can be accessed and executed by the processor, including an activity interpreter module, a lighting control module, preference/learning module, and a user interface module. The processor can be implemented with any number of suitable central processing units or microcontrollers capable of receiving input, executing various routines, outputting control signals, and generally directing the overall lighting process in accordance with an embodiment of the present invention. As will be appreciated, the modules are implemented with software in this example embodiment, but may also be implemented in any one or combination of software, firmware and/or hardware in other embodiments (e.g., using gate level logic or purpose-built silicon). Additional componentry of the lighting computer not shown will be apparent in light of this disclosure, including any necessary hardware and software that enable typical functionality of a computing system (e.g., communication busses, video drivers, ROM, RAM, co-processors, display, input/output circuitry and devices, operating system, etc).

The lighting computer generally operates to receive sensor data from the various physical and/or emotional activity sensors and to interpret that data. This data (e.g., video images, sound files, range data, and/or other sensor data indicating some particular activity or event) is provided to the activity interpreter module which can be programmed or otherwise configured to detect and identify activity (e.g., physical, emotional, aural, smoke, carbon monoxide, etc) reflected in the sensor data. While some sensor data requires less interpretation and effectively speaks for itself (e.g., carbon monoxide or smoke detection signals), other sensor data may require a greater degree of analysis (such as video and audio segments). Such complex sensor data can be evaluated by the activity interpreter module, for instance, much in the same way a computer vision system evaluates such data, as previously discussed. In some example embodiments, the lighting computer is implemented with a computer vision system that is further configured to evaluate both simple and complex sensor data, and assign that data a specific activity label.

As previously indicated, computer vision or so-called machine learning techniques can be used to carryout real-time activity recognition and context modeling. In some example embodiments of the present invention, these techniques can be implemented, for instance, with decision trees, support vector machines, and Bayesian networks. Using multiple simultaneous classifiers in a recognition engine enables a voting scheme in which each registers a confidence vote, and an executive controller arbitrates among the votes to decide when the confidence level is sufficiently high to trigger a system response. Because inaccurate responses would be detrimental to user's reception of the system, confidence thresholds can be initially set conservatively, and express user feedback can be used to strengthen the various confidence votes.

The lighting control module can be programmed or otherwise configured to direct the lighting controller based on the identified activity. In some example embodiments, the lighting control module can be configured, for instance, with a look-up table of fifty to one hundred (or any other number) general and specific activities that can be identified and labeled by the activity interpreter module, with each activity entry in the look-up table associated with a corresponding lighting control response. Thus, once the activity interpreter module identifies and labels a sensed activity, the appropriate lighting control response can be accessed in the look-up table. In some embodiments, the lighting control response can then be implemented, for instance, as a digital control word (or any other suitable control signal) that can be issued to the lighting controller, which will then give effect to the desired lighting response. Numerous such operational schemes will be apparent in light of this disclosure, and the claimed invention is not intended to be limited to any particular one.

Table 1 illustrates an example look-up table (LUT) configured in accordance with one embodiment of the present invention. As can be seen, the LUT lists a plurality of lighting control signals (control word) indexed by activity. As can be further seen, this example embodiment includes a number of diverse applications, including home, business, and public-place oriented situations. Other embodiments may include any other number of example activity based scenarios having desired lighting responses across a narrow or broad range of applications, as will be appreciated in light of this disclosure. The table can be populated with a standard set of such scenarios and/or various customized lighting responses. As will further be appreciated, the lighting responses may be completely practical in nature or more whimsical (e.g., based in humor or novelty) or otherwise attempt to supplement a person's personality or private preferences that are unique to that particular person. Further note that the responses may go beyond controlling lights, and incorporate other aspects (such as music or alarm) that might be desirable or otherwise appropriate.

TABLE 1

Example LUT for Lighting Control Module

| Identified Activity | Control Word | Description |
|---|---|---|
| Walking/hallway | 1011011.000 | Illuminate hallway |
| Reading/Chair | 1111000.001 | Illuminate chair/focus light on book |
| Smoke Alarm | 1111111.111 | All lights on, sound alarm |
| Eating/kitchen table/pm | 0000111.001 | Illuminate kitchen table/soft white light |
| Eating/kitchen table/am | 0000111.101 | Illuminate kitchen table/soft blue light |
| Snoring/living room/couch | 0111000.001 | Dim lights over couch/all others off |
| Reading label/kitchen/strain | 0010101.011 | Illuminate location/direct light on label |
| Crying/bedroom | 1111101.001 | Soft white light/queue inspirational music |
| Laughter/bar area | 1000001.001 | Dim bar lights/queue party music |
| Consumer in jewelry shop passing Rolex display | 1001101.001 | Dim retail shop lights at perimeter of area/bright focused light on the Rolex display |
| ... | ... | ... |

The user interface module is programmed or otherwise configured to allow a user to interact with the system and to provide, for instance, lighting preferences, which can be stored in the preference/learning database, in this example embodiment. As will be further appreciated, the preference/learning database may also store preferences learned or otherwise inferred about a given lighting context and/or particular users of the space to be lit, based on, for instance, historical data.

In one example embodiment, the preference/learning database can be populated through an initial learning or calibration period. In more detail, sensors can be worn on the body of a given user of the space to be lit, and/or installed in at various locations in the space. The deployed sensors can report information that reflects common activity with that space, and that information can then be used by machine learning algorithms to infer what the user is doing and respond in an appropriate fashion for the situation. The various user activities are demonstrated implicitly as the individual interacts with objects that have been instrumented with wireless sensors, or which have been trained for recognition by a computer vision system. Inferences about user behavior are generated by a multi-classifier engine running on a computing system configured with receivers for the sensors. In some such learning mode embodiments, explicit feedback about the user's reaction to the system's performance can be elicited by a handheld computing application (e.g., a mobile phone or tablet computer app) designed to prompt the user at moments when the system has detected a change in behavior. Responses to targeted questions can then be used in a reinforcement learning paradigm to increase or decrease the likelihood that the system will exhibit or otherwise observe the specific behavior in the future. In this way, common activity likely to be repeated in the space can be distinguished from less common or one-off activity. As the system learns the user's desired lighting responses to given activities, the database can be populated accordingly. Such learned activity can further be used to populate an LUT, as will be appreciated.

Figure 4:
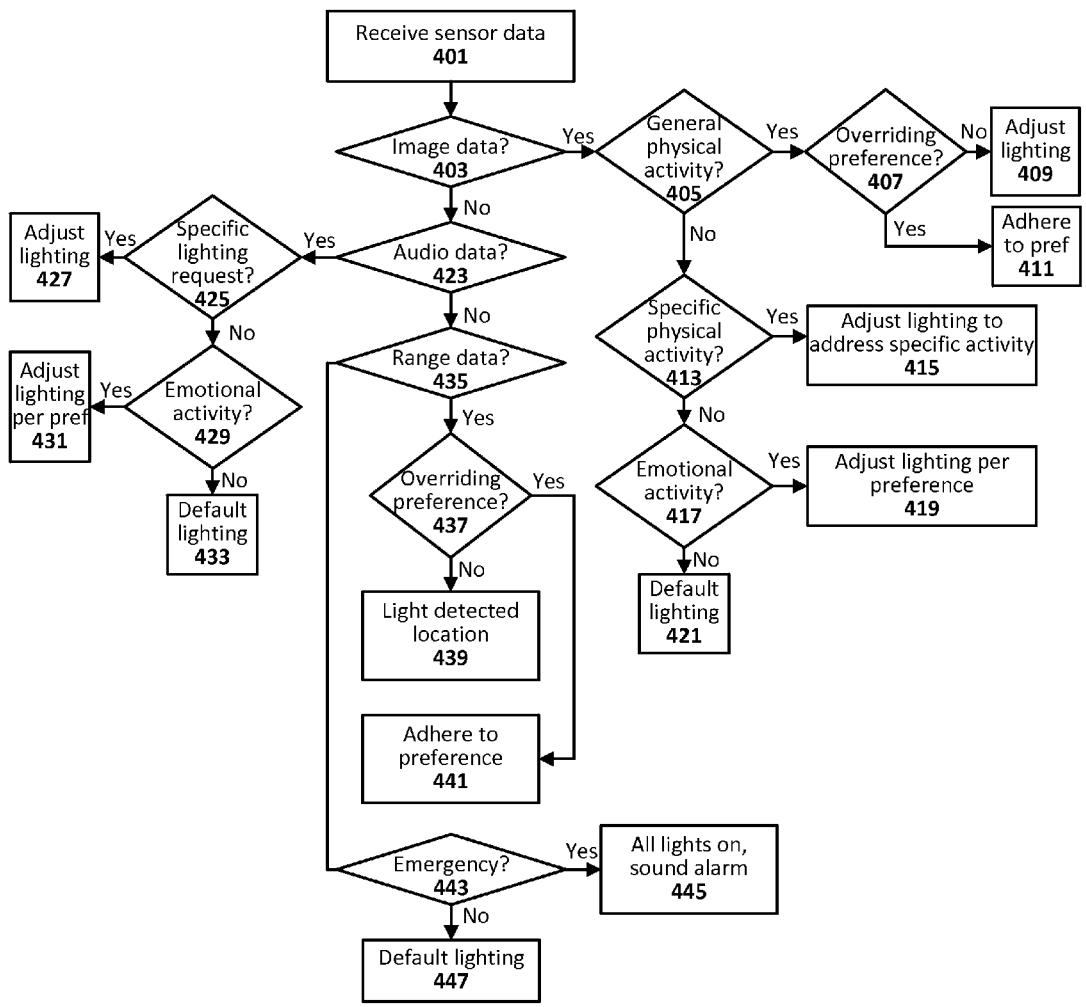
FIG. 4 is a flow chart demonstrating a process flow carried out by activity interpreter and lighting control modules that can be used in the dynamic lighting system of FIG. 1, configured in accordance with an embodiment of the present invention.

FIG. 4 is a flow chart demonstrating a process flow carried out by activity interpreter and lighting control modules that can be used in the dynamic lighting system of FIG. 1, configured in accordance with an embodiment of the present invention. As will be appreciated, the modules are shown as being distinct from one another in the example embodiment of FIG. 1, but in other embodiments may be formed as an integrated module. Various other degrees of component and functional integration or distinctness can be employed as desired, with the overall dynamic lighting control function in accordance with an embodiment of the present invention still resulting.

The methodology of this example embodiment begins with receiving 401 sensor data, which can be evaluated and identified. Thus, the method continues with determining 403 if the sensor data includes image data. If so, the method continues with determining 405 if the image data reflects general physical activity. As previously explained, computer vision technology can be used to identify various types of general physical activity, which can then be labeled accordingly. If the image data reflects general physical activity, then the method continues with determining 407 if there is an applicable overriding preference (e.g., as provided by user via the user interface, or otherwise learned based on historical data). An example user preference might be, for instance, if a user enters the kitchen before 6 am, turn on the stove light only. Thus, if there is an applicable overriding preference, then the method includes adhering 411 to that preference. Otherwise, if there is no applicable overriding preference, then the method continues with adjusting the lighting scheme accordingly (e.g., illuminate the walking path or location of the person).

If, however, the determination at 405 is negative, the method continues with determining 413 if the image data reflects specific physical activity. If so, then the method continues with adjusting 415 the lighting scheme accordingly (e.g., illuminate the label that the user is straining to see with bright white light). If, however, the determination at 413 is negative, the method continues with determining 417 if the image data reflects emotional activity. If so, then the method continues with adjusting 419 the lighting scheme accordingly (e.g., soft white light for sadness; dimmed white and blue light for laughter). If, however, the determination at 417 is negative, the method continues with default lighting 421, which may be, for example, no change in lighting, or some preferred default light scheme defined by the owners/users of the space. Alternatively, the user of the space can be prompted in real-time by the system to identify a preferred lighting response (e.g., via an automated context-aware experience sampling application running on, for instance, a mobile device such as a smart phone or tablet computing device).

If the determination at 403 is negative, the method continues with determining 423 if the sensor data includes audio data. If so, then the method continues with determining 425 if the audio data reflects a specific lighting request (e.g., 'turn lights on', etc). If so, then the method continues with adjusting 427 the lighting in accordance with that request. If, however, the determination at 425 is negative, the method continues with determining 429 if the audio data reflects emotional activity. If so, then the method continues with adjusting 431 the lighting in accordance with the associated preference (e.g., sighing indicative of tiredness=soft white and blue light; put on happy music). If, however, the determination at 429 is negative, the method continues with default lighting 433, which may be, for example, no change in lighting, or some preferred default light scheme defined by the owners/users of the space that indicates the lighting system has taken a default position. In one such example case, a particular light that only comes on during default lighting may be illuminated, so the user will know that default lighting has been engaged.

If the determination at 423 is negative, then the method continues with determining 435 if the sensor data includes range data. If so, then the method continues with determining 437 if there is an applicable overriding preference. If so, then the method continues with adhering 441 to that preference (e.g., if person is 5 meters out near window before 5 pm, don't turn on lights). If, however, the determination at 437 is negative, then the method continues with lighting 439 the detected location (e.g., illuminate location at 5 meters out). In some such cases, such lighting may include a specific light beam if, for instance, a specific activity is further detected at that location (e.g., a conversation between three people, so broaden the beam to encompass all three people). In this way, note that more than one sensor type can be involved in developing the appropriate lighting response.

If the determination at 435 is negative, then the method continues with determining 443 if the sensor data includes emergency signal data (e.g., smoke or carbon monoxide detection signal). If so, then the method continues with turning 445 all lights on and sounding an alarm. If, however, the determination at 443 is negative, the method continues with default lighting 447, which may be, for example, no change in lighting, or some preferred default light scheme as previously explained.

Numerous embodiments will be apparent, and features described herein can be combined in any number of configurations. One example embodiment of the present invention provides a lighting system. The lighting system includes an activity interpreter module for receiving sensor data from one or more activity sensors, the sensor data reflecting an activity occurring in a space to be illuminated, the activity interpreter module further configured for identifying the activity reflected in the sensor data. The system further includes a lighting control module for generating a lighting control signal based on the identified activity in the sensor data, wherein the lighting control signal is for dynamically adjusting at least one of the direction and color of light to be applied to the space. In some cases, the system further includes one or more cameras for providing sensor data. In some cases, the system further includes one or more microphones for providing sensor data. In some cases, the system further includes one or more range finders for providing sensor data. In some cases, the system further includes a database of lighting preferences associated with users of the space. In one such case, the system further includes a user interface for allowing a user to enter lighting preferences into the database. In some cases, the activity interpreter and lighting control modules are included in a computer vision system. In one such case, the computer vision system further includes one or more sensors for providing the sensor data. In some cases, the system further includes a lighting controller configured to receive the lighting control signal and to apply that signal to one or more lighting fixtures. In some cases, the system further includes one or more lighting fixtures. In one such case, at least one lighting fixture is configured with a sensor for providing the sensor data. In another such case, at least one lighting fixture comprises a light emitting diode element. In some cases, the activity interpreter module labels the identified activity and the lighting control module comprises a look-up table that lists a plurality of lighting control signals indexed by activity, thereby allowing an appropriate lighting control signal to be generated based on the identified activity.

Another embodiment of the present invention provides a lighting system. The system includes a camera for providing image data of an area to be illuminated. The system further includes an activity interpreter module for receiving image data from the camera, the image data reflecting an activity occurring in a space to be illuminated. The activity interpreter module is further configured for identifying the activity reflected in the image data. The system further includes a lighting control module for generating a lighting control signal based on the identified activity in the image data, wherein the lighting control signal is for dynamically adjusting at least one of the direction and color of light to be applied to the space. In some cases, the system further includes at least one of a microphone and/or a range finder for providing sensor data to supplement the image data. In some cases, the system further includes a database of lighting preferences associated with users of the space, and a user interface for allowing a user to enter lighting preferences into the database. In some cases, the system further includes a lighting fixture having a plurality of light emitting diode elements, and a lighting controller configured to receive the lighting control signal and to apply that signal to the lighting fixture. In some cases, the lighting fixture is configured with a sensor for providing sensor data. In some cases, the activity interpreter module labels the identified activity and the lighting control module comprises a look-up table that lists a plurality of lighting control signals indexed by activity, thereby allowing an appropriate lighting control signal to be generated based on the identified activity.

Another example embodiment provides a lighting system that includes a lighting fixture for illuminating an area. The system further includes a sensor in physical contact with and operatively coupled to the lighting fixture and for providing sensor data of the area, the sensor data reflecting both general and specific activity occurring in the area. The lighting fixture is dynamically adjustable to provide multiple lighting responses based on activity reflected in the sensor data, such that general activity causes a first lighting response involving changes in on/off state and light intensity of the light fixture, and specific activity causes a second lighting response involving changes in light direction of the light fixture.

Another example embodiment provides a sensing platform, an activity recognition engine, a tunable LED system as an output device, and a feedback interface. In one such embodiment, the sensing platform is configured with sensing devices that can unobtrusively detect common activities, such as passive infrared (PIR) motion sensors, acceleration-based object movement sensors, and vision-based feature extractors. Each of these components will be discussed in turn.

PIR sensors use the differential between the emitted infrared light of a warm body (e.g., a human) and a cooler background (e.g., the environment and furnishings) to infer movement within the environment. In some embodiments, a Fresnel lens is used to focus the infrared light across an IR sensor that records the differential as a voltage signal. Firmware on-board the sensor unit can be tuned to ignore continuous activity lasting longer than 3 seconds in order to conserve battery life, for instance, while still detecting gross motor movements that may indicate transition into and out of the monitored area. The presence of a body in the monitored area can be used to train the system to recognize the difference between meaningful input and background noise that occurs when the space is unoccupied. Immediately upon detection, occupancy data can be transmitted, for example, wirelessly over a 2.4 GHz radio frequency (RF) packetized transmission protocol to a receiver in an embedded server system, in accordance with one such specific example embodiment. The server can then forward the data into the recognition engine (e.g., activity interpreter module of FIG. 1, or other computer vision system) for processing. For continuous movements lasting longer than 3 seconds, for instance, a new packet indicating ongoing activity is broadcast every 10 seconds.

Using the same RF communication protocol as the PIR sensors, in accordance with some embodiments, the acceleration-based object movement sensors transmit data to the embedded server every time a new movement is detected. These sensors are small, integrated units that can be attached to virtually any non-disposable object in the environment that is moved during the course of everyday activity. In one specific example configuration, a 2-axis accelerometer is polled continuously in a low power mode with a high-pass filter designed to remove environmental vibrations. When the acceleration data exceeds a preset threshold, the firmware generates an activity event and transmits this data to the embedded server. When continuous motion exceeding 3 seconds is detected, the sensor enters a low power state and only broadcasts a new event every 10 seconds. Other detection/broadcast schemes will be apparent in light of this disclosure. The object movement sensors can be attached, for example, to common furniture and various domestic implements (e.g., chairs, couches, coffee cups, remote control, etc), office equipment and supplies (e.g., desk chair, table, computer mouse, keyboard, display monitor, stapler, letter tray, pencil holder, etc). A configuration file can be used to provide a mapping between unique sensor IDs and their objects.

Vision-based feature extractors include any number of optical sensors. In one specific embodiment, an optical sensor (e.g., a 1.2 megapixel digital camera) is embedded at various locations, such as a desk lamp fixture or recessed lighting fixture. In one such specific embodiment, when pointed at the desk surface, this camera is able to detect interaction with objects that do not have sensors attached, such as books and paperwork. Using computer vision techniques in accordance with some embodiments, such as edge, grayscale, and gradient matching, the feature extractors look for known objects based on prior training examples, and register movement of these object using pixel displacement techniques. When a recognized object is moved or occluded, this information is forwarded to the recognition engine in the same way as activations of hardware sensors.

As will be appreciated, the sensors can be used to construct representations of ongoing activity through, for instance, the correlation of activation patterns with labels provided by the user through an experience sampling interface. Although specific sensors are permanently associated with known objects or regions, there is no a priori assumption about which sensors will be used in each prediction. Rather, machine learning including decision trees, support vector machines, and Bayesian networks can be used to identify when an activity is occurring based on patterns of recently activated sensors. The activity recognition engine running on, for example, an embedded server (e.g., lighting computer of FIG. 1) takes input from the sensors and repeatedly feeds them through multiple classifiers simultaneously to arrive at consensus or high-probability estimates of the ongoing activity. When a known pattern is detected, client devices such as a lighting control server can be notified of the change through a network interface.

In one specific example embodiment, the output device comprises a group of LED tunable light fixtures with four independently controllable color channels Red, Green, Blue, Yellow, and RGBY. The units can be properly calibrated in order to ensure appropriate lighting for the demonstrated tasks as well as output uniformity throughout the illuminated surfaces, if so desired. As previously explained, the lighting control infrastructure can be based, for example, on software and hardware driving DMX512 controlled lighting fixtures, although any number of suitable lighting controllers can be employed. In accordance with one specific example configuration, once a program is selected to run on a given space, the rules for that program can be sent to the queuing framework and are relayed onto a control relay node that communicates over the Internet to a machine running a light controller application at the installation's physical location. The light controller then reconstructs the program and begins issuing commands to the light fixtures using the DMX interface that is connected, for example, through USB or other suitable communications interface.

For a dynamic lighting program, the lighting transitions can be triggered by events from the recognition engine. As activities are detected, a sensor manager process (e.g., activity interpreter module of FIG. 1) interprets these activities and determines if they represent activations or keep-alive messages (on-going activity previously detected). If they are actual activation data, then such activity can be reported to the sensor relay node on the server side, in accordance with one such embodiment, so as to store the new activation in the database for future machine learning, and write the lighting control word corresponding to the activation to an advanced message queuing protocol, for instance, for transmission to the control relay node and subsequently the light controller. Note that the user may be prompted to assist in identify the appropriate lighting response for such new activations.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:
1. A lighting system, comprising:
an activity interpreter module for receiving sensor data from one or more activity sensors, the sensor data reflecting an activity occurring in a space to be illuminated, the activity interpreter module further configured for identifying the activity reflected in the sensor data;

a lighting control module for generating a lighting control signal based on the identified activity in the sensor data, wherein the lighting control signal is for dynamically adjusting at least one of the direction and color of light to be applied to the space further wherein the activity interpreter module labels the identified activity and the lighting control module comprises a look-up table that lists a plurality of lighting control signals indexed by activity, thereby allowing an appropriate lighting control signal to be generated based on the identified activity; and a context-aware experience sampling application running on a mobile, user device wherein in response to the identified activity, prompts the user on feedback to the adjusting at least one of the direction and color of light applied to the space.

2. The system of claim 1 further comprising one or more cameras for providing sensor data.

3. The system of claim 1 further comprising one or more microphones for providing sensor data.

4. The system of claim 1 further comprising one or more range finders for providing sensor data.

5. The system of claim 1 further comprising a database of lighting preferences associated with users of the space.

6. The system of claim 5 further comprising a user interface for allowing a user to enter lighting preferences into the database.

7. The system of claim 1 wherein the activity interpreter and lighting control modules are included in a computer vision system.

8. The system of claim 7 wherein the computer vision system further includes one or more sensors for providing the sensor data.

9. The system of claim 1 further comprising a lighting controller configured to receive the lighting control signal and to apply that signal to one or more lighting fixtures.

10. The system of claim 1 further comprising one or more lighting fixtures.

11. The system of claim 10 wherein at least one lighting fixture is configured with a sensor for providing the sensor data.

12. The system of claim 10 wherein at least one lighting fixture comprises a light emitting diode element.

13. A lighting system, comprising:
a camera for providing image data of an area to be illuminated;
an activity interpreter module for receiving image data from the camera, the image data reflecting an activity occurring in a space to be illuminated, the activity interpreter module further configured for identifying the activity reflected in the image data;
a lighting control module for generating a lighting control signal based on the identified activity in the image data, wherein the lighting control signal is for dynamically adjusting at least one of the direction and color of light to be applied to the space; and
a context-aware experience sampling application on a user device wherein in response to the activity, prompts a user on feedback to the adjusting at least one of the direction and color of light applied to the space.

14. The system of claim 13 further comprising at least one of a microphone and/or a range finder for providing sensor data to supplement the image data.

15. The system of claim 13 further comprising:
a database of lighting preferences associated with users of the space; and
a user interface for allowing a user to enter lighting preferences into the database.

16. The system of claim 13 further comprising:
a lighting fixture having a plurality of light emitting diode elements; and
a lighting controller configured to receive the lighting control signal and to apply that signal to the lighting fixture.

17. The system of claim 16 wherein the lighting fixture is configured with a sensor for providing image data.

18. The system of claim 13 wherein the activity interpreter module labels the identified activity and the lighting control module comprises a look-up table that lists a plurality of lighting control signals indexed by activity, thereby allowing an appropriate lighting control signal to be generated based on the identified activity.

19. A lighting system, comprising:
a lighting fixture for illuminating an area;
a sensor in physical contact with and operatively coupled to the lighting fixture and for providing sensor data of the area, the sensor data reflecting both general and specific activity occurring in the area; wherein the lighting fixture is dynamically adjustable to provide multiple lighting responses based on activity reflected in the sensor data, such that general activity causes a first lighting response involving changes in on/off state and light intensity of the light fixture, and specific activity causes a second lighting response involving changes in light direction of the light fixture;
an activity interpreter module labels the specific activity and the lighting fixture comprises a look-up table that lists a plurality of lighting control signals indexed by the specific activity, thereby allowing a second lighting response to be generated based on the specific activity; and
a context-aware experience sampling application on a mobile, user device wherein in response to the specific activity, prompts a user on feedback to the second lighting response changes in light direction of the light fixture and computationally ranks in the look-up table the second lighting response to the specific activity.

* * * * *